(No Model.)  6 Sheets—Sheet 1.

O. ASHTON.
SHOE NAILING MACHINE.

No. 602,390. Patented Apr. 12, 1898.

Fig. 1.

WITNESSES.
Geo. W. Louey
B. C. Rotoff

INVENTOR,
Orrell Ashton
BY H. G. Underwood
ATTORNEY.

(No Model.) 6 Sheets—Sheet 2.

O. ASHTON.
SHOE NAILING MACHINE.

No. 602,390. Patented Apr. 12, 1898.

WITNESSES
Geo. W. Young
B. C. Roloff

INVENTOR
Orrell Ashton
BY H. G. Underwood
ATTORNEY.

(No Model.)  6 Sheets—Sheet 3.

O. ASHTON.
SHOE NAILING MACHINE.

No. 602,390.  Patented Apr. 12, 1898.

WITNESSES
Geo. W. Young
B. C. Roloff

INVENTOR,
Orell Ashton
BY
H. G. Underwood
ATTORNEY.

(No Model.) 6 Sheets—Sheet 4.

O. ASHTON.
SHOE NAILING MACHINE.

No. 602,390. Patented Apr. 12, 1898.

WITNESSES
Geo. W. Young,
B. C. Roloff

INVENTOR,
Orell Ashton
BY
H. G. Underwood
ATTORNEY.

(No Model.) 6 Sheets—Sheet 5.

O. ASHTON.
SHOE NAILING MACHINE.

No. 602,390. Patented Apr. 12, 1898.

WITNESSES.
Geo. W. Young
B. C. Roloff

INVENTOR.
Orrell Ashton
BY H. G. Underwood
ATTORNEY.

(No Model.) 6 Sheets—Sheet 6.

O. ASHTON.
SHOE NAILING MACHINE.

No. 602,390. Patented Apr. 12, 1898.

WITNESSES
Geo. W. Young
B. C. Roloff

INVENTOR
Orrell Ashton
BY H. G. Underwood
ATTORNEY

UNITED STATES PATENT OFFICE.

ORRELL ASHTON, OF LAWRENCE, MASSACHUSETTS, ASSIGNOR TO JOHN ASHTON AND JAMES DERBYSHIRE, OF SAME PLACE, AND JAMES W. BROOKS, PRINCIPAL TRUSTEE, OF PETERSHAM, AND F. F. STANLEY, ASSOCIATE TRUSTEE, OF BOSTON, MASSACHUSETTS.

SHOE-NAILING MACHINE.

SPECIFICATION forming part of Letters Patent No. 602,390, dated April 12, 1898.

Application filed May 12, 1897. Serial No. 636,269. (No model.)

*To all whom it may concern:*

Be it known that I, ORRELL ASHTON, a citizen of the United States, and a resident of Lawrence, in the county of Essex and State of Massachusetts, have invented certain new and useful Improvements in Shoe-Nailing Machines; and I do hereby declare that the following is a full, clear, and exact description thereof.

My invention has for its object to simplify and cheapen shoe-nailing machines.

It therefore consists in certain peculiarities of construction and combination of parts hereinafter set forth with reference to the accompanying drawings and subsequently claimed.

Referring by letter to the drawings, A represents the cast-metal standard of my improved shoe-nailing machine, this standard being surmounted by a plate B, on which the machine-head C is supported, said standard-plate and machine-head being in rigid union. The standard is provided with detachable bearings for a horizontal power-driven shaft that carries a pulley D for a cross-belt E, that is also trained on other pulleys F G H, and a tightener I is employed to take up undue slack in the belt. The pulleys F H turn on arbors made fast to the machine-head, and the pulley G has screw-thread connection with a vertical hollow spindle J, that turns in bearings constituting parts of the machine-head. The spindle is provided with a worm K, that drives a worm-wheel K', fast on a shaft L, the latter having its bearings on the machine-head. The shaft carries a series of cams, and each of the latter is hereinafter specified in connection with the movement of which it forms a part.

Figure 11:
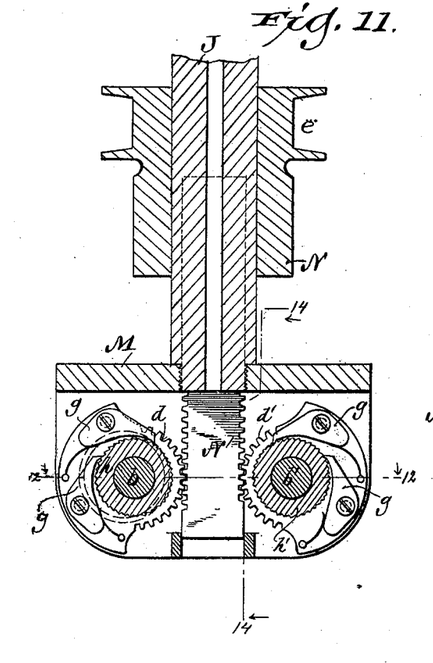
Fig. 11, a detail sectional view of the wire-feeding mechanism set forth herein, this view being indicated by line 11 11 in the fourteenth figure.
Figure 12:
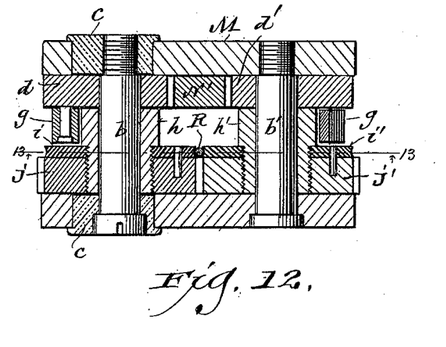
Fig. 12, a similar view indicated by line 12 12 in the preceding figure.
Figure 13:
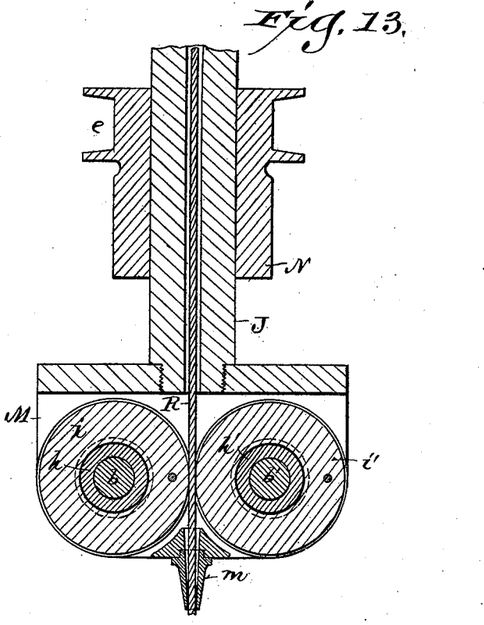
Fig. 13, a like view indicated by line 13 13 in the preceding figure.
Figure 14:
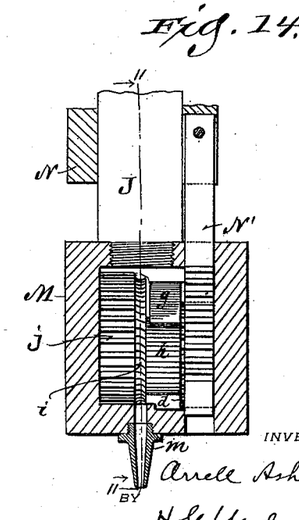
Fig. 14, another detail sectional view of said wire-feeding mechanism, the same being indicated by line 14 14 in the eleventh figure.
Figure 16:
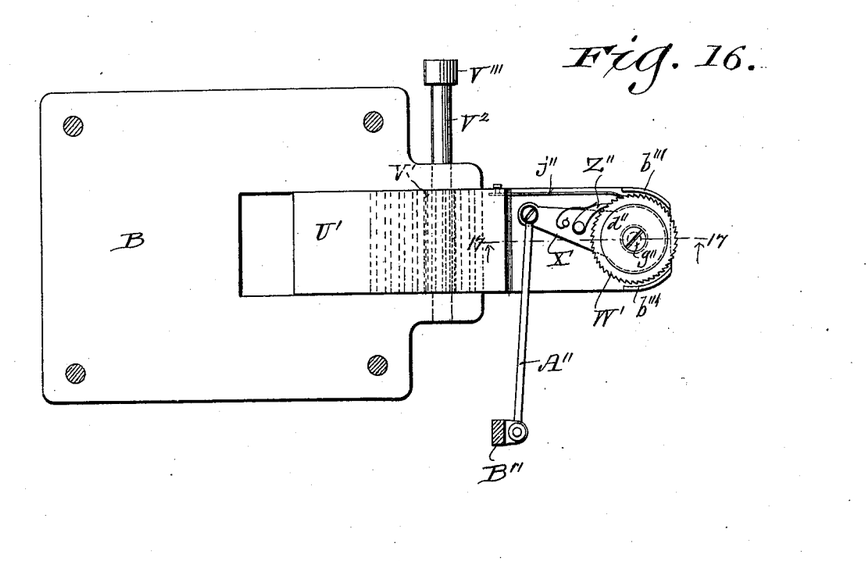
Figure 17:
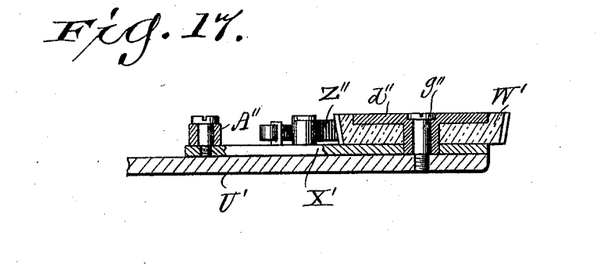
Figure 18:
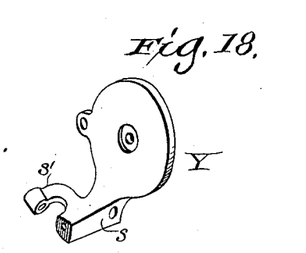
Figs. 18 and 19 represent perspective views of parts involved in the nail-cutting mechanism of the machine.
Figure 19:
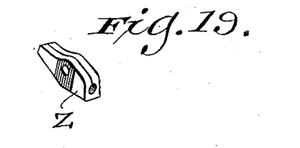

As best shown in Figs. 11 and 13, a housing M has screw-thread connection with the lower end of the spindle J, and this housing is provided with transverse arbors $b\ b'$ in the form of bolts, as clearly illustrated in Fig. 12, one of the arbors being in eccentric engagement with disks $c$, that have rotatory adjustment in the housing for the purpose hereinafter set forth. Loose on the arbors are partial pinions $d\ d'$, in mesh with rack edges of a vertical bar N', made fast to a sleeve N, that has reciprocative engagement with the spindle J, the head of this sleeve being provided with an annular groove $e$ for the engagement of a spanner O, made fast to a partly-tubular reciprocative stem P, that is guided in arms of the machine-head, and an arm P' of the stem carries an antifriction-roller $f$, that is operated upon by a cam Q, in rigid connection with the shaft L above specified.

Each of the partial pinions $d\ d'$ is herein shown as provided with a pair of spring-controlled pawls g, operative in conjunction with a ratchet-sleeve loose on the pinion-arbor. While only one pair of pawls has been shown in connection with each partial pinion, these pawls may be multiplied in practice to compensate for possible lost motion, as well as to lessen wear on the opposing ratchet-teeth and counterbalance strain thereon.

The ratchet-sleeves $h\ h'$ on the arbors $b\ b'$ constitute hubs for rolls in screw-thread engagement therewith, and these rolls operate to feed the shoe-nail wire R. (Shown in Fig. 13.) The rolls are preferably made in sections, the wire-impinging sections being peripherally-grooved washer-like disks $i\ i'$, of hardened steel, in pin-clutch connection with the other sections $j\ j'$, the latter being shown as cog-wheels in mesh with each other. It will be noticed that the disks $i\ i'$ or feed-rolls proper are of considerable diameter, whereby their efficiency is proportionately increased and at the same time there is a reduction of friction, inasmuch as less tension is requisite. It also follows that the feed-rolls being sectional, with only the wire-impinging portions thereof made from hardened steel, the cost of production and repair is cheapened.

Figures 8, 9, 10, 15:
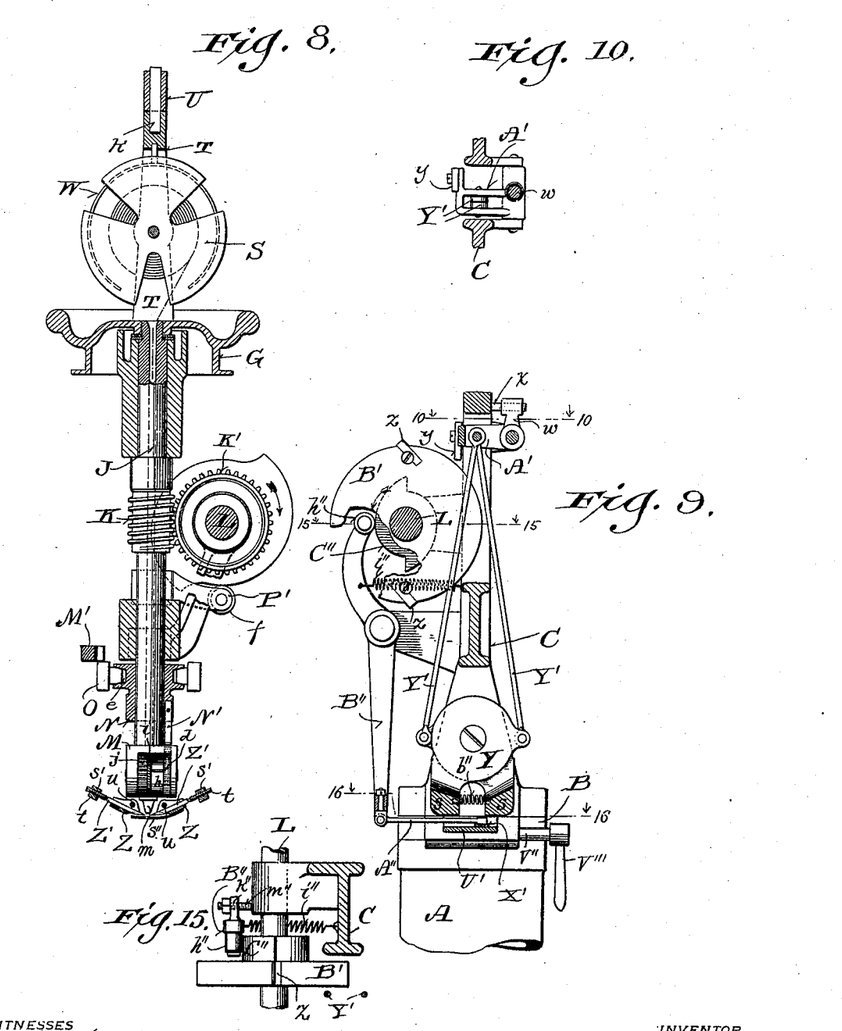
Fig. 8, a detail vertical sectional view indicated by line 8 8 in the aforesaid first figure.
Fig. 9, a similar view indicated by line 9 9 in said second figure.
Fig. 10, a horizontal section indicated by line 10 10 in the preceding figure.
Figs. 15 and 16, detail horizontal sectional views respectively indicated by lines 15 15 and 16 16 in the ninth figure, and Fig. 17 a detail sectional view indicated by line 17 17 in the preceding figure.

The shoe-nail wire is drawn down through the spindle J from a reel S, supported by an arbor mounted in a yoke T, surmounting the pulley G, this yoke being loosely centered on a pin $k$, extending down through an arm U of the machine-head. The reel-heads have their inner sides provided with grooves, each groove being struck on a circle, and forced into these grooves are the edges of a segmental sheet-metal plate W, normally bent on a greater circle than said grooves. The segmental plate has stationary pin connection with the yoke T, as shown in Fig. 8, and is therefore held stationary to act as a friction that prevents turning of the reel, except when wire is being drawn therefrom by the action of the feed-rolls. After passing the feed-rolls the wire finds its exit from housing M through a nipple $m$, depending therefrom, and the amount of feed is automatically proportioned to the thickness of material to be nailed together, as hereinafter set forth, tension on said wire being regulated by rotatory adjustment of the disks $c$ above specified as having eccentric engagement with one of the bolt-like arbors in the housing. The adjustment being effected, tightening of the arbor locks the disks securely in their adjusted position.

Figure 4:
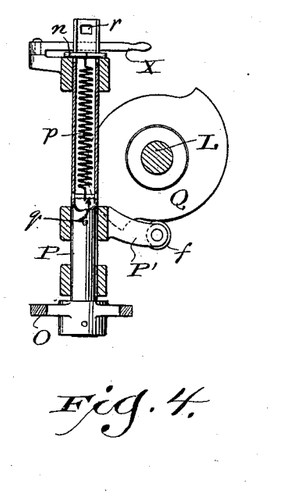
Fig. 4, a detail vertical section indicated by line 4 4 in the second figure.

The tubular stem P has its upper end provided with a kerf for play on a transverse pin $n$, that rests on the upper bearing for said stem, and a spiral spring $p$ connects the pin with another pin $q$, made fast in the aforesaid stem, as clearly illustrated in Fig. 4. The spring operates as a resistance to the action of cam Q above specified and reacts to automatically lift stem P and the sleeve N, having spanner connection therewith. The upper end of the stem is also shown provided with a recess $r$ for the engagement of a latch-bar X, that is pivoted on the upper stem-guide, whereby said stem may be held down far enough to prevent contact of cam Q with the antifriction-roller carried by the stem-arm P', thus putting the wire-feeding mechanism out of operation without stopping the machine.

From the foregoing it will be seen that the feed of the wire is direct and positive in proportion to the reciprocal play of the sleeve N, having the depending rack-bar N' in mesh with the partial pinions $d\ d'$, above specified, and the tension of the feed-rolls being had, as above set forth, there is no liability of its working loose or having variation. Consequently there will be no spoiling of shoes due to imperfect or variable tension of the wire.

In pivotal connection with the machine-head are a pair of disks Y, each provided with an offset-arm $s$, having a branch $s'$, in which a set-screw $t$ is adjustable. In screw connection with the disk-arm $s$ is clip Z, of spring metal, that constitutes a holder for a wire-cutting knife Z', the opposing faces of the arm and clip being corrugated to prevent pivotal slip of the latter on the former. By tightening the clip-holding screw $u$ the knife is firmly clamped in longitudinally-adjusted position, and the set-screw $t$ is adjusted against the butt of said knife to prevent yield of the latter in a direction away from the wire.

Each of the disks Y is connected by a link Y' with a lever A', fulcrumed on the machine-head and provided with an arm $w$, in which a stop $x$ has screw adjustment, this stop coming to rest against said machine-head. Detachably secured to the lever is a contact-block $y$ in the path of cam-lugs $z$, that have tangential adjustment in a disk B', fast on shaft L, these lugs being extended beyond the disk-periphery. The operation of a cam-lug against the contact-block of the lever causes upward tilt of the latter, and thus the disks Y are swung on their pivot to cause cutting of the wire by the knives Z', a spiral spring $b''$, intermediate of the disk-arms, being contracted incidental to the lift of said lever. Subsequent expansion of the spring operates to automatically return the disks and parts in connection therewith to normal position, and one of said disks is shown as having its arms $s$ provided with a plate $s''$, against which the material to be nailed is clamped, this plate being provided with an aperture through which the wire has its feed, it being understood that the cutting action is timed to take place subsequent to each feed of the wire.

From the foregoing it will be seen that the knife mechanism is not only simple, positive, and practical, but at the same time the knives are firmly gripped and cannot spring away when in the act of cutting.

Figure 1:
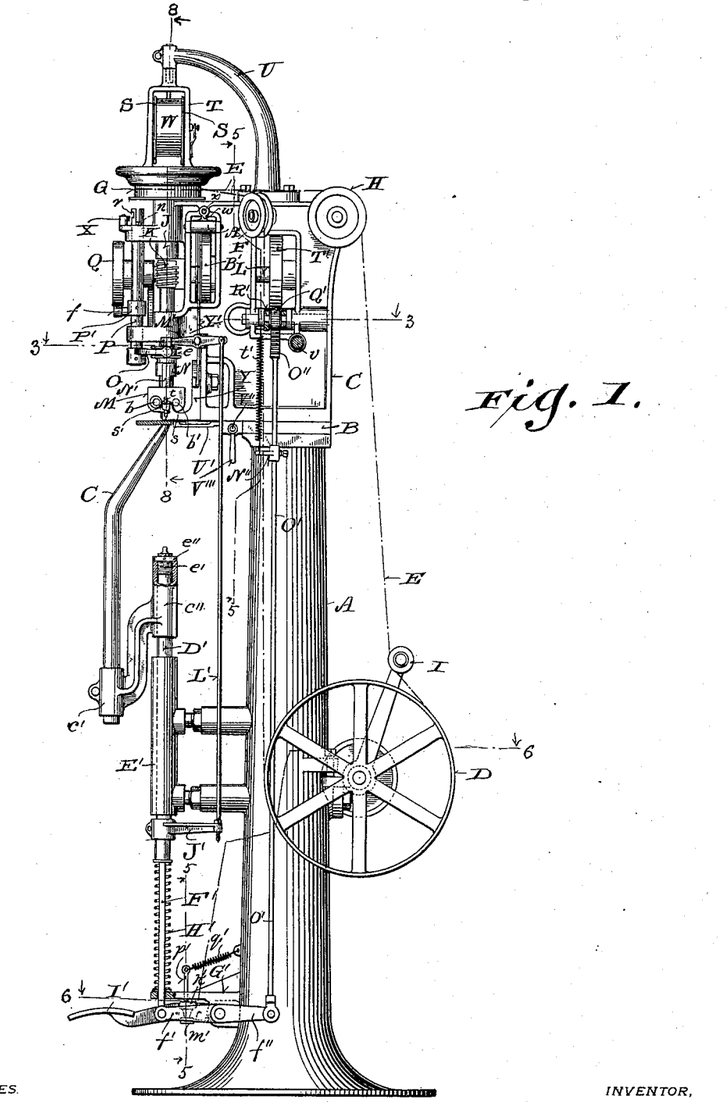
Figure 1 of the drawings represents a partly-sectional view of one side of a shoe-nailing machine embodying my improvements.
Figure 2:
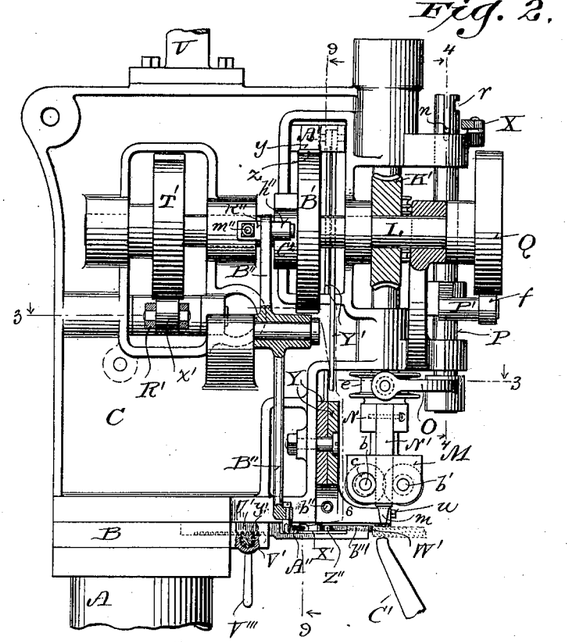
Fig. 2, a similar view of the head portion of the machine as seen from the side opposite that shown in the preceding figure.
Figure 3:
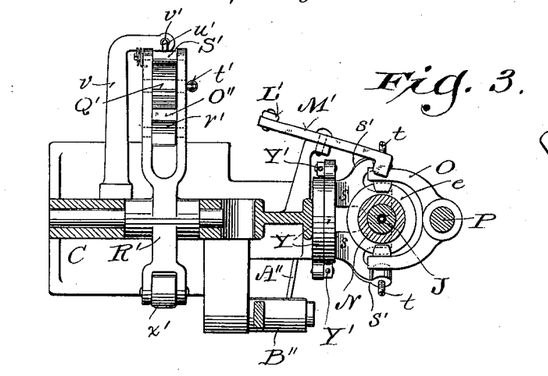
Fig. 3, a detail horizontal sectional view indicated by line 3 3 in each of the two preceding figures.

The shoe or material to be nailed is supported on a horn C, the latter being in the form of a rod having a tapered and offset upper end. The horn is made fast in the lower vertical sleeve-arm $c'$ of a bracket having an upper vertical sleeve-arm c'', provided with a screw-plug e', adjustable therein and held in adjusted position by a set-nut e'', this plug being a pivot at rest on a rod D' in loose engagement with a vertical sleeve E' in laterally-adjustable connection with the machine-standard, as clearly illustrated in Fig. 1. The rod has a shank F' joined to an arm f' of a lever fulcrumed to a bracket G' of said standard. A spiral spring H' surrounds the shank F' between the rod D' and an arm of the bracket G', through which said shank has play, and a treadle I', also fulcrumed to said bracket, has a lateral angle-lug k', that impinges against another lug m', extending laterally from the lever-arm f' aforesaid. Hence it will be seen that upon depression of the treadle there will be draft upon the supporting-rod D' when it is desirable to lower the horn from its normal position in order to remove or replace a shoe. A stem p', extending up from the treadle, is connected by a spiral spring q' with the machine-standard, and this spring operates by contraction to return said treadle to normal position when foot-pressure is removed, the spring H' operating to lift and provide yielding support for the horn-holder.

While provision is had for depression of the horn by means of the treadle, it is to be understood that said horn is capable of movement in a downward direction independent of said treadle, as will appear from the hereinafter-described arrangement of parts, whereby provision is had for gaging the feed of the wire to the thickness of the material operated upon, and particular attention is called to the screw-plug pivot e' as a means for obtaining fine adjustment of the aforesaid horn, so as to insure proper nailing of the shoe.

The rod D' is provided with an arm J' in adjustable link connection L' with one end of a lever M' in pivotal connection with the machine-head, the other end of this lever being in opposition to the spanner O above specified. In proportion to the thickness of the material on the horn and consequent depression of the latter the lever M' is automatically adjusted with reference to the spanner O in order to regulate lift of the same, whereby the stem P is likewise regulated in its upward movement to determine the position of the antifriction-roller f, carried by the stem-arm P' with reference to the face of the opposing cam. The thicker the material on the horn the higher the lift of the spanner and consequent greater time of contact between the cam Q and antifriction-roller aforesaid to effect depression of the rack-carrying sleeve N, whereby there is sufficient feed of wire to provide a nail of the proper length.

Another arm f''' of the lever, fulcrumed to the bracket G' of the machine-standard, is in pivotal connection with the shank O' of a rack O'' in mesh with pinion-teeth of a disk Q', having rotative connection with a lever R', fulcrumed on the machine-head, the rack being guided by an antifriction-roller r', also trunnioned in the bifurcated lever.

An arm N'', vertically adjustable on the shank O' of the rack O'', is connected by a spiral spring t' with the lever R', and thus a yielding connection is established between said link and lever, the spring being fully expanded when no work is on the shoe-supporting horn and having contraction in proportion as the thickness of material on said horn causes depression of the latter to thereby effect tilt of the two-armed lever fulcrumed to the bracket G' of the standard.

Figures 5, 6, 7:
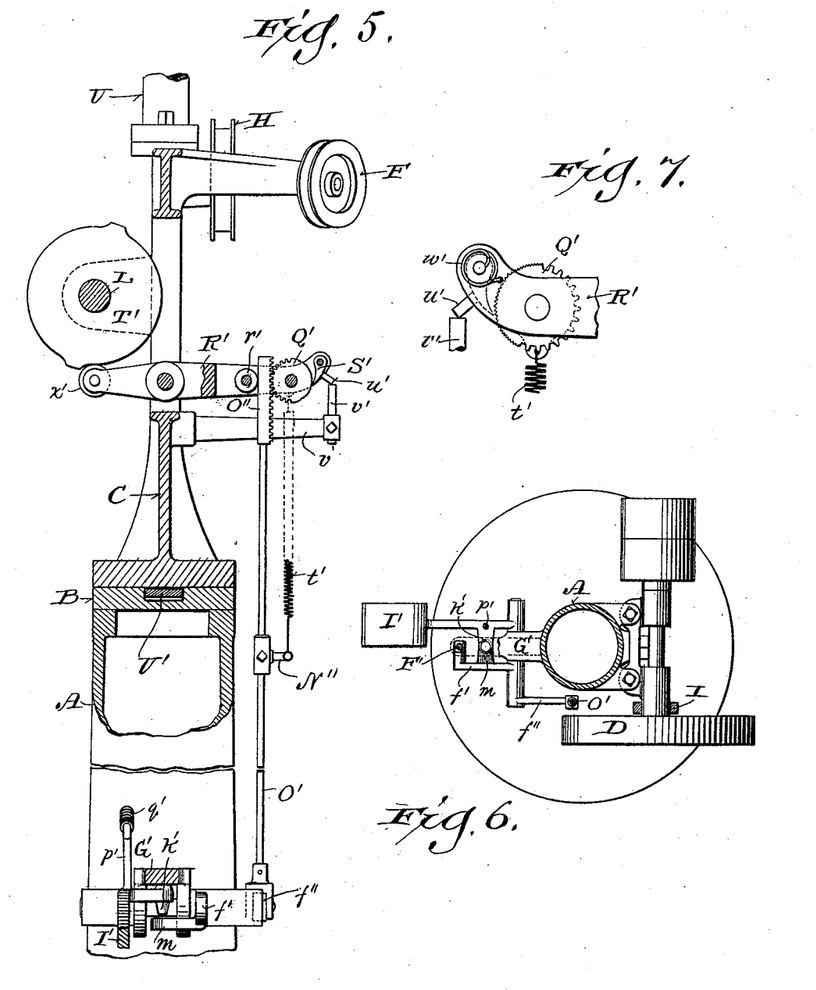
Fig. 5, a similar view indicated by lines 5 5 in the first figure.
Fig. 6, a horizontal sectional view indicated by line 6 6 in said first figure.
Fig. 7, a detail side elevation of a portion of a lifting mechanism constituting part of the machine.

The disk Q' is provided with ratchet-teeth in opposition to a detent S', trunnioned in the lever R', and this detent has a lug u', that normally abuts a post v', vertically adjustable in an arm v of the machine-head to hold said detent out of engagement with the ratchet-toothed portion of said disk against resistance of a spring w', arranged as shown in Fig. 7. The lever R' carries an antifriction-roller x' in opposition to a cam T' on shaft L aforesaid.

Depression of the horn by the material thereon causes corresponding lift of rack O'', and simultaneous with tilt of lever R' by cam T' the detent S' operates to lock disk Q' in its engagement with said rack, whereby further automatic depression of said horn is had to obtain clearance for feed of said material prior to the driving of another nail therein.

The action of cam T' takes place to relieve clamping pressure on the shoe after a nail has been driven and cut, and by means of the mechanism hereinafter set forth there is automatic feed of said shoe to bring another portion thereof under the wire.

Guided in a recessed portion of the plate B, surmounting the machine-standard, is a carrier U', having its under side provided with a rack y' in mesh with a pinion V' on a rod V'', that has its bearings on the under side of said plate and is provided with a crank V''', whereby provision is had for adjusting the carrier with respect to the width of the shoe on the horn. The outer end of the carrier has the upper portion thereof recessed and provided with guard-flanges b''' for a ratchet-wheel W', loose on a stud d'', the latter having a flanged upper end countersunk in the wheel. The stud is held fast to the carrier by means of a bolt g'', and an arm X' has loose engagement with said stud intermediate of the ratchet-wheel and said carrier. A spring-controlled pawl Z'' on the arm X' engages with the ratchet-wheel, and the latter also constitutes a feed-wheel for a shoe on the horn of the machine, the teeth of said wheel being preferably on a bevel to prevent filling with leather. A link A'' is connected to the pawl-arm X', and this link is also in universal-joint connection with a lever B'', fulcrumed to an arm of the machine-head. An antifriction-roller $h''$, carried by the lever, has contact with a cam $C''$, fast on shaft L, and a spiral spring $i'''$ is also employed to connect the lever and machine-head. While the cam is operating the lever, the pawl $Z'$ is slipping back on the ratchet-wheel, the latter being at that time held stationary by means of a detent $j''$, made fast to the carrier $U'$, it being understood that said wheel has impingement against the horn-supported shoe then being nailed and that while the slipping of said pawl is taking place the spring $i'''$ is being expanded. Simultaneous with the nail-cutting operation the cam $C''$ ceases to operate the lever $B''$, and the latter is retracted by contraction of the spring $i'''$, this retraction of said lever and parts in connection therewith causing partial rotation of the ratchet-wheel $W'$ to effect feed of the shoe then released from clamping pressure.

In order to vary feed of the shoe, and thereby regulate nail-spacing, the lever $B''$ is provided with a wing $k''$, and a stop-screw $m''$, adjustable in this wing, abuts a cam-shaft bearing on the machine-head, as shown in Fig. 15, it being obvious that the farther in the screw is run the shorter the time of action of cam $C''$ on said lever, whereby the throw of the pawl-carrying arm $X'$ is correspondingly shortened.

Having thus described my invention, what I claim as new, and desire to secure by Letters Patent, is—

1. In a shoe-nailing machine, in combination, a spindle, coacting rolls for feeding the wire through the spindle, and means for positively rotating each of said rolls independently of the other.

2. In a shoe-nailing machine, in combination, a spindle, coacting rolls for feeding the wire through the spindle, and a rack-bar for positively rotating each of said rolls independently of the other.

3. In a shoe-nailing machine, in combination, coacting rolls for feeding the wire through the spindle, a pinion connected to each of said feed-rolls, and a rack for positively engaging and rotating both said pinions.

4. In a shoe-nailing machine, in combination, coacting rolls for feeding the wire through the spindle, pinions connected to said feed-rolls, a rack for positively engaging and rotating each of said pinions, independently of the other, and a sleeve on which said rack is mounted.

5. In a shoe-nailing machine, in combination, coacting rolls for feeding the wire through the spindle, a pinion for each roll, pawls carried by said pinions for engaging the rolls and a double-toothed rack arranged between and engaging said pinions to rotate them.

6. In a shoe-nailing machine, the combination of the wire-guide spindle and wire-feed including coacting feed-rolls in connection therewith, a sleeve reciprocating on said spindle, a bar carried by the sleeve to positively operate said feed-rolls independently of each other, and an automatically-adjustable stop arranged to limit reciprocation of said sleeve.

7. In a shoe-nailing machine, the combination of the wire-guide spindle, and wire-feed mechanism in connection therewith, including feed-rolls, a sleeve reciprocative on said spindle, a bar carried by the sleeve to positively operate both feed-rolls of the wire-feed mechanism independently of each other, an automatically-adjustable stop arranged to limit reciprocation of said sleeve and suitable means for putting the aforesaid sleeve out of action without stopping the machine.

8. In a shoe-nailing machine, the combination of the wire-guide spindle having a depending housing provided with a wire-delivery nipple, transverse arbors in the housing, partial pinions and ratchet-sleeves loose on the arbors, pawls carried by the partial pinions and operative in conjunction with the ratchet-sleeves, feed-rolls for the wire fast to said ratchet-sleeves, and a sleeve loose on said spindle and provided with a depending rack-bar in mesh with said partial pinions.

9. In a shoe-nailing machine, the combination of the wire-guide spindle, a sleeve loose on said spindle and provided with means for feeding the wire through the spindle, a spring-controlled stem loose in suitable guides, means connecting the stem and spindle-engaging sleeve, a cam operative in conjunction with the stem, an automatically-adjustable stop arranged to limit reciprocation of said spindle-engaging sleeve in proportion to thickness of material being nailed, and a latch-bar for engagement with the aforesaid stem to hold the latter out of action.

10. In a shoe-nailing machine, the combination of the wire-guide spindle and wire-feed mechanism in connection therewith, a sleeve reciprocative on said spindle, a bar carried by the sleeve to operate in conjunction with the wire-feed mechanism, a lever disconnected from the sleeve and fulcrumed to the machine-head to operate as a stop for limiting the reciprocation of said sleeve, a yielding shoe-horn support, and a link connecting the shoe-horn support with the aforesaid lever.

11. In a shoe-nailing machine, a wire-reel comprising heads having their inner sides provided with grooves struck on a circle, and a stationary segmental plate of sheet metal that is normally of greater radius than said grooves but has its edges forced therein, this plate constituting a frictional resistance to prevent turning of said reel except when wire is being drawn therefrom.

12. In a shoe-nailing machine, a pair of spring-controlled pivotal devices each provided with an offset arm having a branch, adjusting means in the arm branch, a clip mounted on said arm, a wire-cutting knife clamped in the clip to abut the adjusting means in said arm branch, a lever connected with said pivotal devices, and a cam-disk operative to tilt the lever at predetermined intervals.

13. In a shoe-nailing machine, the combination of a pair of spring-controlled pivotal supports for knife-holding clips, a lever connected to said support, a contact-block in connection with said lever, a rotative disk and adjustable cam-lugs extending from the periphery of the disk to operate against said contact-block on the lever and adjustable about a concentric circle inside the periphery of the cam.

14. In a shoe-nailing machine, the combination of a yielding support, a bracket having a sleeve-arm thereon loosely engaging the support, a screw-plug in the upper end of the sleeve-arm at rest on said support to constitute a pivot, a set-nut for the screw-plug and a shoe-supporting horn connected to the bracket.

15. In a shoe-nailing machine, the combination with a wire-feed mechanism, a wire-cutting mechanism and a shoe-horn supporting and adjusting mechanism; of a longitudinally-adjustable carrier, a ratchet-wheel mounted on and extended beyond the carrier to impinge a shoe on the horn, an oscillating arm mounted on the carrier and provided with a pawl engaging the ratchet-wheel, a detent for said ratchet-wheel, and means for oscillating said arm, a lever fulcrumed to the machine-head and having universal-joint connection with the link, a spring connecting the lever and machine-head, and a rotative cam exertive against said lever in opposition to the resistance of the spring.

16. In a shoe-nailing machine, the combination with a wire-feed mechanism, a wire-cutting mechanism and a shoe-horn supporting and adjusting mechanism, of a longitudinally-adjustable carrier, a ratchet-wheel loosely mounted on and extended beyond the carrier to impinge a shoe on the horn, an oscillating arm also mounted on the carrier and provided with a pawl engaging the ratchet-wheel, a detent for said ratchet-wheel, a lever fulcrumed to the machine-head and in link connection with the pawl-arm, a spring connecting the lever and machine-head, a rotative cam operative against said lever and resistance of the spring, and a stop in adjustable connection with the aforesaid lever to vary the time of action by the cam, whereby the throw of the pawl-arm is correspondingly regulated.

17. In a shoe-nailing machine, a horn, means for forcing nails into the work, and a feeding device for engaging the edge of the sole, comprising an inverted frusto-conical wheel having a toothed periphery, and means for imparting an intermittent rotation to the wheel.

In testimony that I claim the foregoing I have hereunto set my hand, at Lawrence, in the county of Essex and State of Massachusetts, in the presence of two witnesses.

ORRELL ASHTON.

Witnesses:
HENRY TONGUE,
HENRY W. CHASE.